United States Patent
Kester

[15] 3,659,400
[45] May 2, 1972

[54] CARBON DIOXIDE REMOVAL FROM BREATHABLE ATMOSPHERES

[72] Inventor: Frank L. Kester, West Granby, Conn.
[73] Assignee: United Aircraft Corporation, East Hartford, Conn.
[22] Filed: July 21, 1970
[21] Appl. No.: 56,794

[52] U.S. Cl. .................................55/33, 23/2 S, 55/58, 55/68
[51] Int. Cl. ..........................................B01d 53/02
[58] Field of Search..............23/25, 2 A, 150; 55/28, 33, 55/68, 74, 387

[56] References Cited

UNITED STATES PATENTS

| | | | |
|---|---|---|---|
| 2,818,323 | 12/1957 | Haensel | 23/2 S |
| 2,143,393 | 1/1939 | Ulrich et al. | 23/2 A |
| 3,355,860 | 12/1967 | Arnoldi | 55/68 |
| 3,547,684 | 12/1970 | Hollis et al. | 55/67 X |

Primary Examiner—Reuben Friedman
Assistant Examiner—R. W. Burks
Attorney—Richard N. James

[57] ABSTRACT

In the purification of breathable atmospheres, carbon dioxide is selectively removed therefrom and concentrated in a process wherein the contaminated gas stream is passed through a porous bed comprising beads of a solid porous polymer of divinylbenzene coated with polyethylenimine wherein the carbon dioxide is sorbed, the carbon dioxide subsequently being removed from the bed by vacuum desorption at low temperature in a bed regeneration sequence.

1 Claims, 3 Drawing Figures

INVENTOR
FRANK L. KESTER
BY Richard U. James
ATTORNEY

CARBON DIOXIDE REMOVAL FROM BREATHABLE ATMOSPHERES

BACKGROUND OF THE INVENTION

The present invention relates to a method for the selective removal of carbon dioxide from breathable atmospheres.

In the development of closed-cycle life support systems, there is a need for more efficient methods of removing carbon dioxide from cabin air. At the present time, the systems typically require close control of the moisture content of the airstream for carbon dioxide removal and, in addition, typically require high bed temperatures for regeneration. This necessitates considerable dehumidification apparatus operable in conjunction with the adsorption equipment and, further in many cases, because of the temperatures involved, considerable weight and power losses. Furthermore, in some instances, the temperature levels required are conducive to rapid bacterial multiplication.

As reported in an article titled Water Analysis by Gas Chromotography Using Porous Polymer Columns, Journal of Gas Chromotography, July 1966, it was observed that columns packed with porous aromatic hydrocarbon polymers can separate the common gases for water analysis. In particular the polymer of divinylbenzene was found to be effective. Furthermore, it was found that modification of the polymer with polyethylenimine was effective for the separation of the amine gases. Other investigators have also researched the problem as reported in the publication titled Separation of Gaseous Mixtures Using Porous Polyaromatic Polymer Beads, Analytical Chemistry, Vol. 38, No. 2., February 1966.

What is still required in the lift support technology is a simple, reliable method for selectively separating carbon dioxide from the non-contaminating components of a breathable airstream in an efficient manner.

SUMMARY OF THE INVENTION

The primary objective of the present invention is to provide a process for the selective removal of carbon dioxide from breathable atmospheres in a reliable, efficient manner.

Briefly described, the process contemplates:

circulating the contaminated breathable gas containing carbon dioxide through a porous bed comprising beads of a solid porous polymer of divinylbenzene coated with polyethylenimine;

sorbing carbon dioxide in the bed while concomitantly desorbing and sorbing water vapor, if present, in the carbon dioxide sorption cycle;

periodically isolating the bed from the breathable gas stream and selectively desorbing the carbon dioxide therefrom;

and subsequently reusing the desorbed bed for further decontamination of the breathable gas.

In the process, carbon dioxide may be sorbed in either a wet or dry bed, or from a humid or dry gas stream, eliminating the need for prior ancillary moisture control apparatus, and carbon dioxide removal from a humid gas stream is selective with little or no water loss. Furthermore, regeneration of the bed in the carbon dioxide concentration cycle is performed at relatively low temperatures.

DESCRIPTION OF THE PREFERRED EMBODIMENTS

Figure 1:
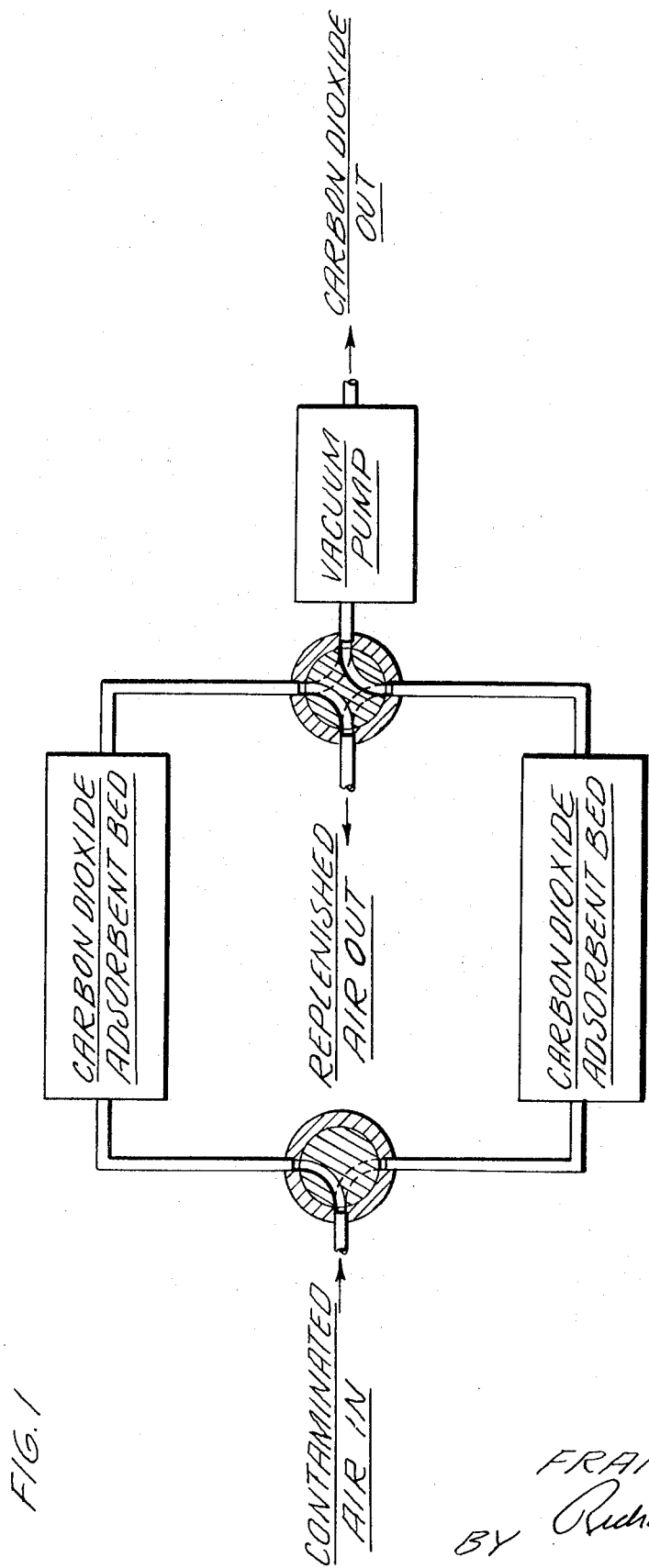
FIG. 1 is a simple schematic of a carbon dioxide concentrator subsystem.
Figure 2:
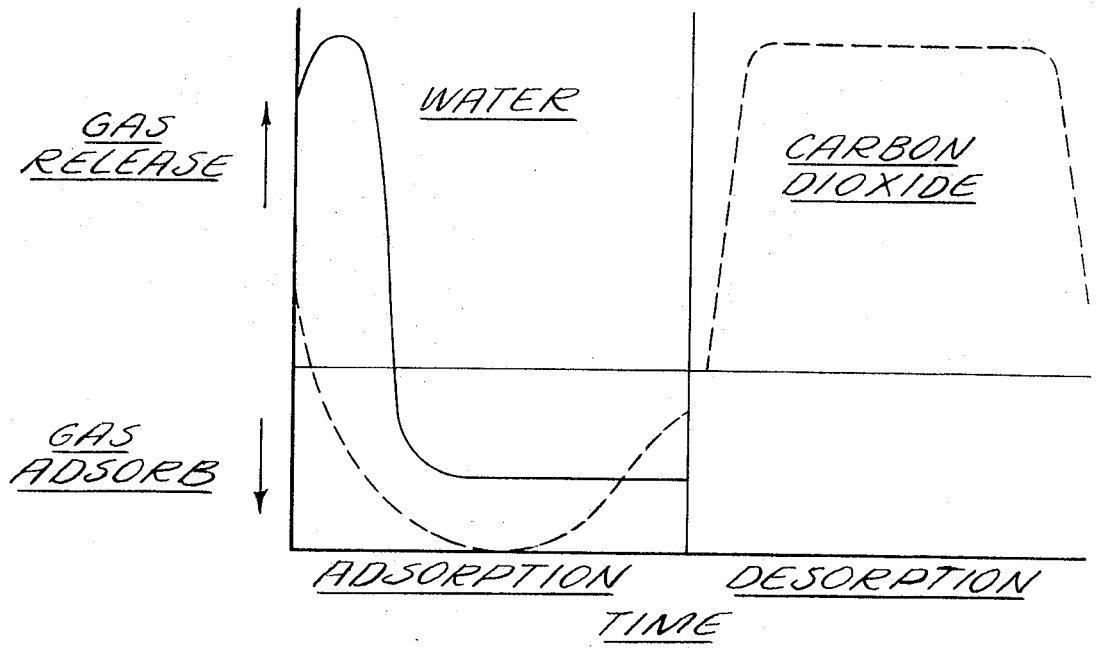
FIG. 2 is a graphical representation of the sorption-desorption process of the present invention.
Figure 3:
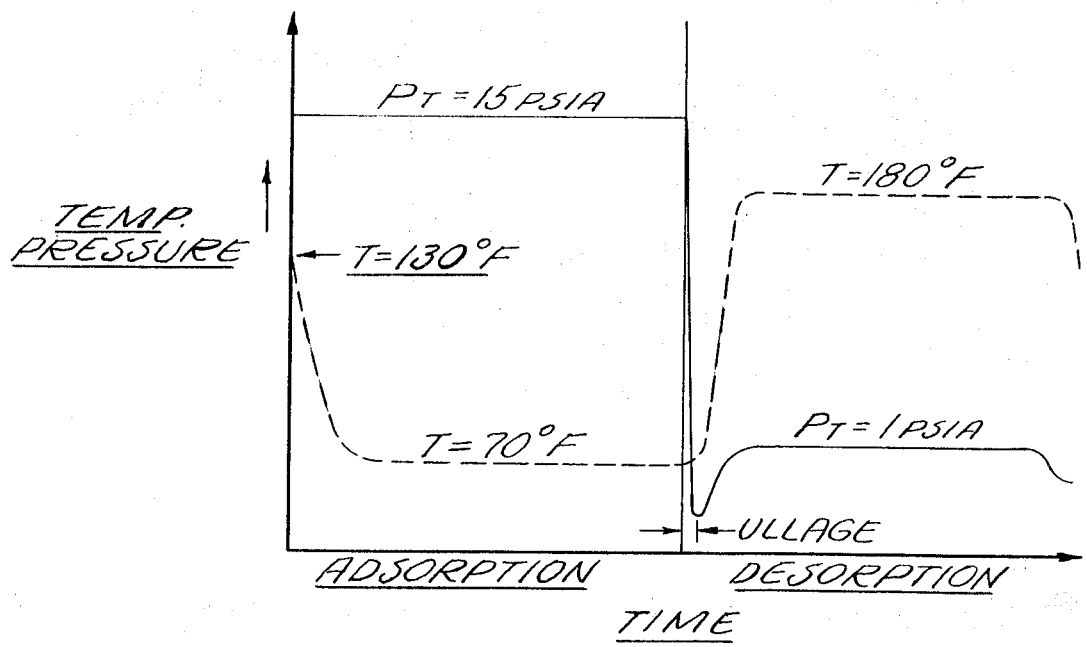
FIG. 3 is a graph similar to that of FIG. 2 showing the characteristics of the process at various operating parameters.

As previously mentioned, the present process contemplates the selective removal of carbon dioxide from breathable gases in regenerable porous beds. Thus, the individual bed is cycled through a sorption sequence wherein carbon dioxide is removed from the breathable gas and a desorption cycle wherein the carbon dioxide is selectively purged from the bed during regeneration thereof. This may be accomplished in a very simple subsystem such as that illustrated in FIG. 1.

The mechanism by which the polyethylenimine coated divinylbenzene bed effects removal of the carbon dioxide is not completely understood. The process may involve chemisorption, adsorption or permeation, or perhaps some other mechanism. As described herein, the process or processes involved are collectively referred to as sorption.

When processed in the manner described, at the beginning of the sorption cycle, water vapor present in the bed, if any, typically from a previous sorption cycle, is flushed off the bed and returned to the gas stream. Part way through the sorption cycle, the water has essentially all been flushed off the bed into the gas stream and the bed begins to resorb water vapor, this time from the incoming gas stream. At the same time carbon dioxide is being sorbed in the bed. Thus, in the presence of water vapor, as is usually the case in the gas stream of a life support system, water is both desorbed and sorbed in the bed in the carbon dioxide sorption cycle under the proper conditions. Also with proper operation, carbon dioxide is subsequently vacuum desorbed from the bed at low temperature, such as 180° F. and 1 p.s.i.a., with little or nor water loss in the sequence. Thus, in the complete cycle, the breathable atmosphere is purged of carbon dioxide which in turn is concentrated with little or no water vapor contamination.

In one series of tests solid beads of divinylbenzene (available as PORAPAK Q from Waters Associates, Inc. Framingham, Mass) in a mesh size of 50–80 were coated with polyethylenimine to 10 percent by weight and packed in a bed. Gas system conditions were as follows:

Sorption
  Gas Supply        1% $CO_2$ in $N_2$
  Part. Press. $CO_2$   7.6 mm Hg
  Total Press.      760 mm Hg (14.7 p.s.i.a.)
  Bed Temp.         72°F.
  Gas Flow          100 cc./min.
  Dew Point         50° F.
Desorption
  Bed Temp.         180° F.
  Press.            0.5–3 p.s.i.a.

Generally speaking, the following results were attained. The maximum capacity of the bed in terms of carbon dioxide capture appeared to occur at lineal gas velocities of about 0.01 ft./sec. At 1 p.s.i.a., the bed capacity for carbon dioxide was about 1.45 percent by weight, although the dynamic capacity was seen to vary with desorption conditions. When the bed was subjected to very hard vacuum conditions ($\approx 200$ microns) in desorption, a bed capacity maximum of about 3 weight percent was observed. Decreasing the desorption pressure may thus be seen to increase the potential carbon dioxide capture capacity. However, at this hard vacuum and below about 1 p.s.i.a. significant quantities of water are also desorbed. Thus, a carbon dioxide concentrator operated in this manner would require carbon dioxide-water separation.

In related studies, the extent of carbon dioxide desorption from the bed under differing conditions of pressure was investigated. The results are summarized in Table I.

TABLE I

| Desorption | |
|---|---|
| System Pressure mm. Hg | $CO_2$ desorbed % |
| 8.0 | 66 |
| 3.5 | 74 |
| 0.2 | $\approx 100$ |

During bed regeneration, the effect of temperature was also investigated. As expected, it was found that an increase in temperature did effect an increase in effective desorption pressure. Thus, at 150° F. the desorption pressure was found to be just about twice that at 100° F. However, a principal advantage of the present process is that high temperatures are not required for effective processing of the gas stream and, hence, the entire cycle may be conducted isothermally.

To ascertain the relative effectiveness and efficiency of the present process, it was compared with several alternative schemes which have previously been proposed. In this study, the parameters were all compared to the nearest common baseline. For example, in computing relative weights, not only sorbent weight was considered, but necessary system, redundancies, and weight penalties arising from energy requirement directly attributable to the particular process involved.

These results are summarized in the following tables.

In these tables, the various processes have been coded as follows:

Process A—the present invention (2 bed)
Process B—processing utilizing a molecular sieve/silica gel combination (4 bed)
Process C—Immobilized Amine (2 bed)
Process D—Steam desorption Ion Exchange Resin The comparisons were based on the following basic criteria:
Endurance 500 days – no resupply
$CO_2$ Production 0.81 lb. $CO_2$/hr.
System Press. 7.5–10 p.s.i.a.
$CO_2$ Press. 7.6 mm. Hg.

TABLE II

| Is it possible to | Process | | |
|---|---|---|---|
| | A | C | D |
| Operate bed dry | yes | no | no |
| Operate at low humidity | yes | no | no |
| Operate at high humidity | yes | no | no |

In Table III, Design 1 represents the situation where thermal energy is obtained through Joule heating and Deisgn 2 represents an advanced concept where thermal energy arises from isotopic heat. In terms of performance and reliability, all of the systems are relatively equal. The system required by the present process A enjoys a significant advantage over those of B and C in terms of both weight and volume. While process A does not enjoy a significant weight advantage over D, it should be noted that process D requires a number of condensor/separators operating at about 200° F. These units represent a prime location for bacterial propagation and, furthermore, the condensor/separator apparatus, when required, necessitates precise pressure regulation for proper operation.

TABLE III

| | Process | | | | | | | |
|---|---|---|---|---|---|---|---|---|
| | A | | B | | C | | D | |
| Design | 1 | 2 | 1 | 2 | 1 | 2 | 1 | 2 |
| Parameter equiv. wt., lbs.: | | | | | | | | |
| Basic unit | 257 | 257 | 385 | 393 | 337 | 337 | 269 | 231 |
| Spares | 295 | 295 | 331 | 331 | 303 | 303 | 231 | 231 |
| Elec. power | 521 | 86 | 376 | 237 | 865 | 142 | 453 | 81 |
| Thermal power | | 48 | | 15 | | 80 | | 62 |
| Rod. load | 67 | 67 | 114 | 114 | 263 | 263 | 195 | 195 |
| Total | 1,140 | 753 | 1,206 | 1,090 | 1,768 | 1,165 | 1,148 | 800 |
| Volume (ft.³) | 28 | | 37 | | 33 | | 24 | |

Thus, there has been provided a process for selectively removing carbon dioxide from breathable atmospheres which is not only efficient, but reliable and lightweight. While the invention has been described in connection with certain preferred embodiments for the purposes of illustration, those skilled in the art will recognize that the invention is its broader aspects is not limited to the specific details described, and departures from such details may be made within the scope of the appended claims without departing from the principles of the invention and without sacrificing its chief advantages.

What is claimed is:

1. The method of selectively removing carbon dioxide from breathable atmospheres which comprises:
   circulating the breathable gas containing carbon dioxide through a porous bed comprising finely divided particles of polymerized divinylbenzene coated with polyethylenimine;
   adsorbing carbon dioxide in the bed at a temperature of about 50°–100° F. while concomitantly desorbing and sorbing water vapor, if present, in the carbon dioxide adsorption cycle;
   periodically isolating the bed from the breathable gas stream;
   selectively desorbing the carbon dioxide from the bed at a pressure of 1—3 p.s.i.a. at a temperature not exceeding about 200° F.; and
   subsequently reconnecting the bed to the breathable gas stream for further carbon dioxide removal therefrom.

\* \* \* \* \*